United States Patent [19]

Amburn

[11] 4,240,365
[45] Dec. 23, 1980

[54] MAGNETIC SEED PLANTER

[75] Inventor: Raymond D. Amburn, Sterling Heights, Mich.

[73] Assignee: Dickey-john Corporation, Auburn, Ill.

[21] Appl. No.: 972,823

[22] Filed: Dec. 26, 1978

Related U.S. Application Data

[63] Continuation of Ser. No. 737,298, Nov. 1, 1976, abandoned.

[51] Int. Cl.³ .............................. A01C 1/00; A01G 7/04
[52] U.S. Cl. ............................................. 111/1; 47/1.3
[58] Field of Search ........................ 111/1, 75, 77, 76; 47/1.3, DIG. 9; 222/197, 200; 221/200, 212

[56] References Cited

U.S. PATENT DOCUMENTS

| | | |
|---|---|---|
| 971,692 | 10/1910 | Schnelle . |
| 2,278,150 | 3/1942 | Roscoe ................... 111/75 |
| 2,675,942 | 4/1954 | Vogelsang ................ 47/DIG. 9 |
| 3,347,426 | 10/1967 | Morrison et al. ........... 111/77 X |
| 3,434,437 | 3/1969 | Mark et al. .............. 111/78 X |
| 3,460,492 | 8/1969 | Dickinson et al. ............ 111/1 |
| 3,675,367 | 7/1972 | Amburn ................... 47/1.3 |
| 3,765,125 | 10/1973 | Amburn ................... 47/1.3 |
| 3,912,121 | 10/1975 | Steffen ................... 111/1 |
| 3,976,017 | 8/1976 | Leffler .................... 111/1 |

FOREIGN PATENT DOCUMENTS

| | | |
|---|---|---|
| 1003042 | 1/1977 | Canada .................... 47/1.3 |
| 511829 | 6/1976 | U.S.S.R. .................. 47/DIG. 9 |

OTHER PUBLICATIONS

Pittman, U. J. et al., "Physiological and Chemical Features of Magnetically Treated Winter Wheat Seeds and Resultant Seedlings," *Canadian Journal of Plant Science*, vol. 50, pp. 211-217, May 1970.

*Primary Examiner*—Edgar S. Burr
*Assistant Examiner*—James R. Feyrer
*Attorney, Agent, or Firm*—Trexler, Wolters, Bushnell & Fosse, Ltd.

[57] ABSTRACT

Planting apparatus including a supporting frame adapted to be connected to a tractor or similar vehicle; a seed hopper mounted on the supporting frame for containing a supply of seeds, and seed metering mechanism spaced beneath the discharge outlet of the seed hopper for controlling the movement of the seeds discharged from the hopper on the ground. A magnetic seed treating device is disposed in the path of seeds discharged from the hopper for causing the seeds to pass through a magnetic field to magnetically treat the seeds as the seeds are planted.

7 Claims, 3 Drawing Figures

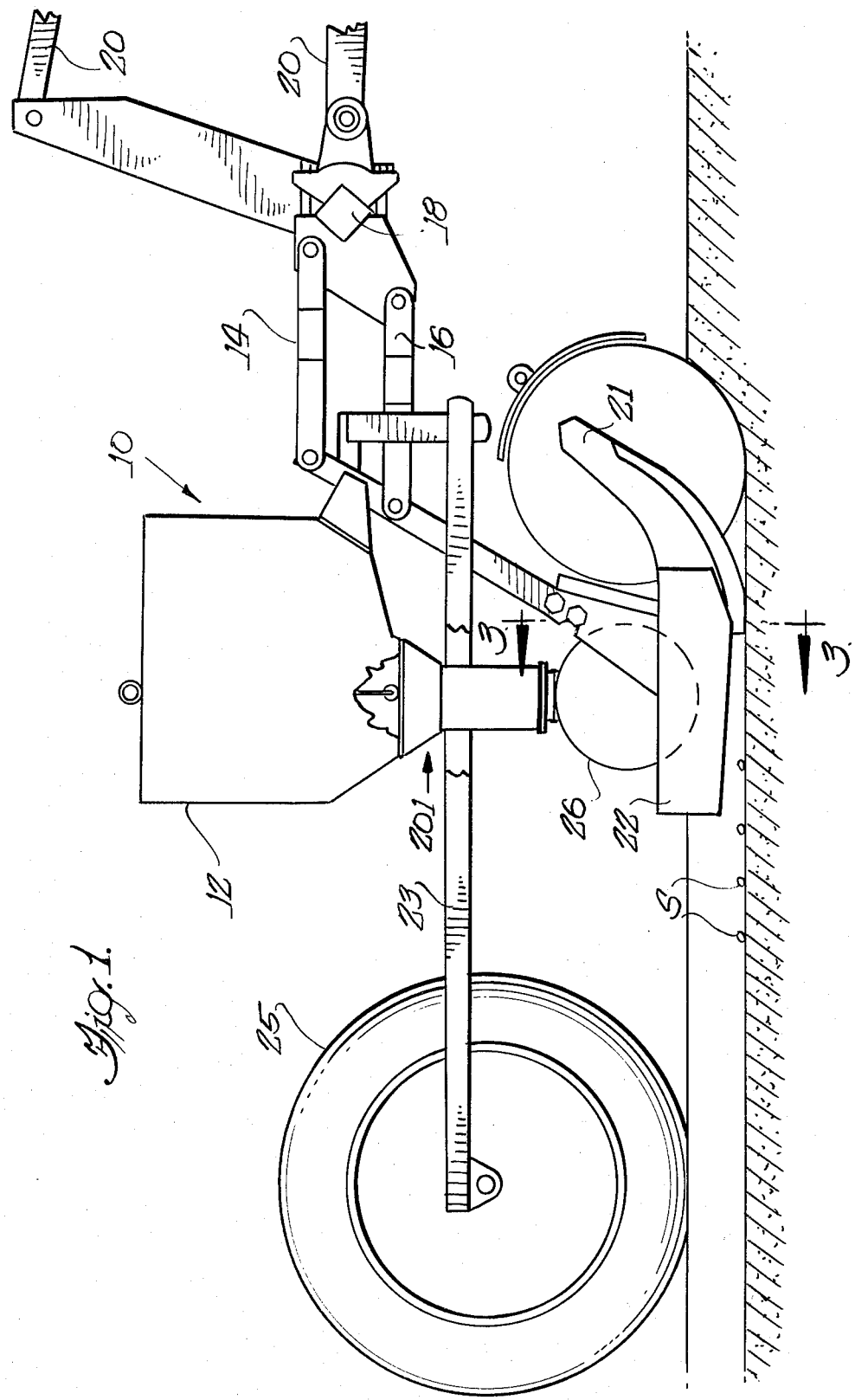

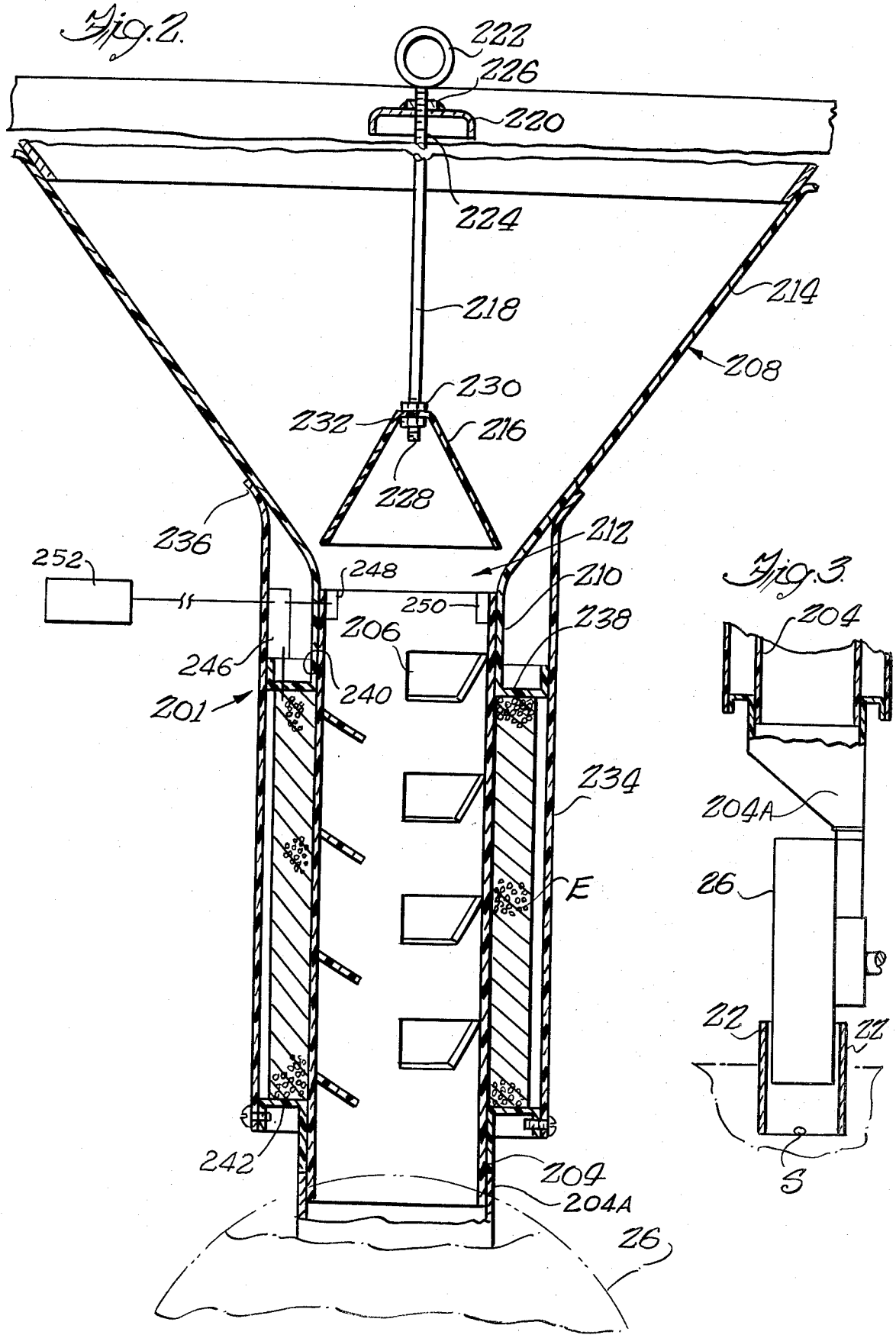

MAGNETIC SEED PLANTER

This is a Continuation, of application Ser. No. 737,298, filed: Nov. 1, 1976, now abandoned.

BACKGROUND OF THE INVENTION

1. Field of the Invention

This invention relates generally to seed planters, and is particularly concerned with planters having a magnetic seed treating device thereon for treating seeds as they are planted exposing the seeds to magnetism to increase the rate of germination of the seeds and the rate of plant growth from the seeds.

2. Description of the Prior Art

As discussed in the prior U.S. Pat. Nos. 3,675,367 and 3,765,125, it has been long known that the rate of germination of seeds and the rate of plant growth from the seeds is effected by magnetism. The latter patents disclose apparatus for "inducing magnetism" into the seeds by conveying the seeds through a magnetic field in large quantities, the apparatus being constructed to reduce the time necessary to "induce magnetism" into the seeds.

As discussed in U.S. Pat. Nos. 3,675,367 and 3,765,125, the exact type of action that takes place when the seeds are exposed to a magnetic field is not completely known. However, when a seed is placed between the north and south poles of a horseshoe magnet for a period of time, it is known that the seed will germinate faster and that the resulting plant will be larger than plants from seeds not so treated. This phenomenon is discussed in the summer, 1968 issue of Canada Agriculture in an article entitled "Biomagnetism—A mysterious plant growth factor" by U. J. Pitman. In the latter referred to publication, it is pointed out that seeds that have been placed in a stationary position between the poles of a permanent magnet for periods of up to 240 hours prior to planting germinate faster and grow more during the seedling stage.

As discussed in the above referred to U.S. Pat. Nos. 3,675,367 and 3,675,125, it is believed that the time required to adequately magnetically treat a seed depends to a large extent on the position of the seed with respect to the magnetic field, and that there is an ideal position for each seed with respect to the magnetic field in which the seed will become almost instantaneously energized by the magnetic field. It is believed that "magnetism" is induced into the seeds through the RNA (Ribonucleic acid) molecules, and that the RNA molecules orient themselves with respect to the magnetic field when the seed is placed in the magnetic field. If the seed were placed in the ideal position in the magnetic field, the effects of magnetism would be induced into the seed almost instantaneously. As pointed out above, if the seed is placed in a stationary position, it will become "magnetized after an exposure of 240 hours which appears to indicate that under the worse circumstances, that is, with the seed in the worst possible orientation with respect to the magnetic field, the seed will be magnetized after a period of 240 hours.

Another factor in successively increasing the rate of germination of seeds and the rate of plant growth from the seeds with magnetic treatment is that the seeds must be planted within a reasonable period of time after undergoing the magnetic treatment. Ideally, the seeds should be planted immediately after the magnetic treatment.

SUMMARY OF THE INVENTION

Accordingly, it is a general object of this invention to provide a seed planting apparatus adapted for inducing magnetism into seeds during the planting operation and prior to the delivery of the seeds to the ground to be planted.

A more specific object of this invention is to provide a seed planting apparatus in accordance with the foregoing object, in which the magnetically treated the seeds as they move along a path of travel from the seed hopper of the apparatus to a seed metering device such as a precision seed dispenser for controlling the movement of the seeds onto the ground.

A further object is to provide seed planting apparatus in accordance with the foregoing objects, wherein seeds are caused to move in a tortuous path through a magnetic field to control the rate of movement, and hence the time of exposure of the seeds in the magnetic field.

In carrying out the foregoing, and other objects, planting apparatus according to a preferred embodiment of the present invention includes a supporting frame for connection with a tractor. A seed hopper is mounted on the supporting frame for containing a supply of seeds. Magnetic seed treating means is mounted on the frame and disposed in the path of seed discharged from the hopper causing the seed to pass through a magnetic field to magnetically treat the seeds.

Further in accordance with the preferred embodiment, magnetic seed treating means includes a tubular conduit mounted to receive seeds from the discharge outlet of the hopper. A magnet is mounted on the tubular conduit for providing a magnetic field within the conduit. Deflecting elements are mounted in the tube in the path of movement of seeds passing through the magnetic field to cause the seeds to move in a tortuous path through the conduit to control the rate of movement of the seeds through the conduit, and hence the time of exposure of the seeds to the magnetic field.

Other objects, advantages and features of the invention will become apparent from the following description, taken in connection with the accompanying drawings.

DESCRIPTION OF THE DRAWINGS

FIG. 1 is a side elevation of a seed planter embodying the invention;

FIG. 2 is an enlarged sectional view of the magnetic seed treating means of the seed planter of FIG. 1; and FIG. 3 is a sectional view taken approximately on lines 3—3 of FIG. 1.

DESCRIPTION OF THE PREFERRED EMBODIMENTS

In FIG. 1, the magnetic seed planter is designated collectively by reference numeral 10. The magnetic seed planter 10 includes a hopper 12 supported on link members 14 and 16. Link members 14 and 16 are secured to a tool bar 18. The tool bar 18 is connected with the rear draft links 20 of a tractor (not shown).

Disposed beneath the hopper 12 in engagement with the ground is a furrow opening member 21 having diverging blades 22 (FIG. 3). As the furrow opening member 21 advances toward the right, as viewed in FIG. 1, to open a furrow, seeds s are deposited in the furrow. A press wheel 25 rotatably mounted on the end of a draw bar 23 closes the furrow over the seeds in a conventional manner.

Received between the blades 22 is a seed dispensing mechanism 26. The seed dispensing mechanism 26 may be of the type disclosed in U.S. Pat. Nos. 3,347,426 and 3,434,437, for example. The seed dispensing device 26 dispenses seeds at a selected rate as the planter advances over the ground. The specific construction of the seed metering and dispensing mechanism 26 forms no part of the present invention.

The seed dispensing mechanism 26 may be rotatably mounted on the planter and interconnected through chain drives or the like with the press wheel 25 such that rotation of the press wheel causes rotation of the seed dispensing mechanism 26. Again, reference may be had to U.S. Pat. Nos. 3,347,426 and 3,434,437 for a suitable chain drive connection between the seed dispensing mechanism and the press wheel 25.

The magnetic seed treating means is shown in detail in FIG. 2, and is collectively designated by reference numeral 201 and comprises an electromagnet E mounted on a tubular conduit 204 of plastic or other relatively non-magnetic material. A plurality of deflecting elements in the form of stationary baffles designated by reference numeral 206 are mounted in the tubular conduit within the field of the magnet E. The deflecting elements or baffles 206 are each comprised of plastic or other relatively non-magnetic material, and are inclined downwardly and inwardly toward the center of the tube 204. Each of the baffles has one end mounted in the wall of the tube 204.

The baffles 206 are successively axially spaced along the length of the tube, and each projects downwardly and inwardly from the wall of tube 204 toward the longitudinal axis of tube 204 to cause seeds falling through the tube to move in a tortuous path through the conduit 204 to control the rate of movement of seeds through the conduit, and hence the exposure time to the magnetic field.

Mounted on the tubular conduit 204 is the feed hopper 208 having a hollow, cylindrical mounting portion 210 telescopically mounted on one end of the tubular conduit 204 and defining a feed opening 212 from the hopper 208 into the end of tube 204. The hopper 208 has a wall portion 214 extending outwardly from the mounting portion 210 in a funnel-like manner.

The rate of flow of seeds from the hopper 208 into the upper end of tube 204 is controlled by a seed metering member 216 carried at one end of a rod 218 mounted on a cross bar 220. The cross bar 220 extends diametrically across the hopper 12 with its opposite end secured in a conventional manner to opposite surfaces of the wall of hopper 12. Rod 218 is adjustably mounted in the cross bar 220 and is formed at its upper end with an eyelet 222. Rod 218 is threaded at 224 adjacent the eyelet 222 for adjustment relative to a nut 226 secured to the upper surface of the cross bar 220. The lower end of the rod is threaded as shown at 228 for threaded engagement with nuts 230 and 232 for adjustably securing the metering member 216 relative to the feed opening 212. The metering member 216 is in the form of a conical, hollow plastic member; and adjustment of the metering member 216 axially relative to the feed opening 212 varies the size of the opening and hence the rate of flow of seeds from hopper 208 into the upper end of tube 204.

The coil windings of the electromagnet E are enclosed by an outer cylindrical casing 234 which is concentric with the tubular conduit 204 and has one end 236 which projects axially beyond the inlet end of the tubular conduit 204 for engagement with the outer surface of the upwardly extending wall 214 of the hopper 208. End 236 of the casing 234 is outwardly flared to better receive the outwardly flared wall 214 of the hopper. An annular end cover member 238 overlies one end of the windings of magnet E adjacent the inlet end of the tubular conduit 204 and extends between the outer casing 234 and the outer surface of tube 204. The end cover 238 is formed with an inner flange 240 engaging the lower end of the mounting portion 210 and defines a support for the hopper mounting portion 210. A similar end cover 242 extends between the lower end of the outer casing 234 and the outer surface of tube 204 for covering the lower end of the windings of the electromagnet E.

The seeds are fed into the upper end of tube 204 and are caused to roll and tumble while in the field of magnet E by the deflecting elements 206 so that each seed assumes a variety of positions relative to the magnetic field as it passes through the magnetic field. As the seeds fall through the tube 204, the baffles 206 interrupt the travel of the seeds through the magnetic field and cause the seeds to bounce back and forth in a tortuous path as they move through tube 204.

In the illustrated embodiment, it is estimated that each seed is in the magnetic field for approximately three seconds during which time the seed is caused to assume numerous positions with respect to the magnetic field.

As the seeds fall through the lower end of tube 204, they are guided by a guide chute 204A (FIG. 3) into the seed metering and dispensing mechanism 26.

It is also within the scope of the invention to monitor the seeds falling from the hoppers 12 and 208 past the metering device 216 into the tube 204 in such a manner that the operator receives a signal if the seed flow is interrupted, or if the magnet E is not energized. For example, a power source 246 to the electromagnet E can be controlled by a photoelectric cell 248 located at or near the upper end of tube 204. When seeds fall past the metering member 216 into tube 204, a light beam, from a light source 250, incident upon the photo-electric cell is interrupted to cause the electromagnet E to be energized, and at the same time activate a light signal 252 visible to the operator in the tractor or draft vehicle. The light signal will thus indicate to the operator whether the flow of seeds has been interrupted and whether the magnet E is energized.

Instead of the photo-electric cell 248, a micro-wave transmitter and receiver may be utilized to monitor the flow of seeds and energize the electromagnet E in response to the flow of seeds.

While a specific form of the invention has been illustrated and described in the accompanying drawings and the foregoing specifications, the invention is not limited to the exact construction shown. Alternative construction and arrangement of parts, all falling within the scope and spirit of the invention, will be apparent to those skilled in the art.

The embodiments of the invention in which an exclusive property or privilege is claimed are defined as follows:

1. A mobile seed planting apparatus comprising: a supporting frame adapted to be connected to a tractor or the like; a hopper mounted on said supporting frame for containing a supply of seeds and having a seed outlet, a plurality of seed delivery means connected with said seed outlet for delivering seeds therefrom to a plurality of rows on the ground to be planted, and magnetic treatment means connected with each of said seed delivery means and including tubular conduit means forming a path of travel for seeds prior to said delivery thereof to the ground and magnetic seed treating means mounted on said tubular conduit means for inducing a magnetic field in said path of travel for magnetically treating said seeds passing therethrough, substantially immediately prior to delivery of said seeds to the ground.

2. A field planter comprising: a mobile frame carrying seed hopper means for containing a supply of seeds, said seed hopper means having seed outlet means, tubular conduit means connected with said seed outlet means of said hopper means for forming a path of travel for seeds therefrom en route to the ground to be planted, magnetic field producing means mounted on said tubular conduit means for magnetically treating said seeds in a predetermined portion of said path of travel, means for receiving said seeds from said portion of said path of travel and delivering said seeds substantially immediately to the ground, and a plurality of deflecting elements mounted in said tubular conduit and disposed within said predetermined portion of said path of travel for causing said seeds to assume a plurality of orientations while in said predetermined portion of said path of travel.

3. A field seed planter according to claim 2 wherein said magnetic field producing means comprises a substantially annular electromagnet mounted in surrounding relation on said tubular conduit.

4. A field planter as claimed in claim 2 wherein said magnetic field producing means comprises an electromagnet, and further including means for monitoring the flow of seeds from the seed outlet means of said hopper means into the field of said electromagnet and for energizing said electromagnet in response to flow of seeds from said seed outlet means into the field of said magnet, and for deenergizing said electromagnet when the flow of seeds is interrupted.

5. A field planter as claimed in claim 4 wherein said means for monitoring controls a signal indicating whether the flow of seeds has been interrupted and the electromagnet is energized.

6. A field seed planter comprising: a mobile frame carrying seed hopper means for containing a supply of seeds, said seed hopper means having seed outlet means, seed delivery means connected with said seed outlet of said hopper means and forming a path of travel for delivering seeds therefrom to the ground to be planted, and means adjacent a portion of said path of travel for magnetically treating said seeds substantially immediately prior to said planting thereof wherein said portion of said path of travel comprises tubular conduit means and said means for magnetically treating comprises electromagnet means mounted in surrounding relation on said tubular conduit means, and further including a plurality of stationary baffles successively axially spaced along the length of the interior of said conduit means, each projecting downwardly and inwardly toward the longitudinal axis of the conduit to control the rate of movement of seeds through said magnetic field for exposing each seed to the magnetic field for on the order of substantially three seconds and for causing said seeds to assume a plurality of orientations while in said magnetic field.

7. A field seed planter comprising in combination: hopper means for containing a supply of seeds, tubular conduit means connected with said hopper and forming a path of travel for seeds, said tubular conduit means being of a plastic or other relatively non-magnetic material, an electromagnet mounted in surrounding relation to said tubular conduit for providing a magnetic field in a portion of said path of travel, a plurality of deflecting elements comprising stationary baffles mounted in the tubular conduit within the magnet field in the path of travel, said deflecting baffles each being of a plastic or other relatively non-magnetic material, each of said baffles further having one end mounted to a wall of the tubular conduit and being successively axially spaced along the length thereof and projecting downwardly and inwardly from said wall toward the longitudinal axis of the tubular conduit to cause seeds passing through the path of travel to move in a tortuous path through the tubular conduit to control the rate of movement of seeds therethrough and the exposure time of said seeds to said magnetic field and means for recieving seeds from said portion of said path of travel and for delivering seeds substantially immediately to the ground.

* * * * *

UNITED STATES PATENT AND TRADEMARK OFFICE
CERTIFICATE OF CORRECTION

PATENT NO. : 4,240,365
DATED : December 23, 1980
INVENTOR(S) : RAYMOND D. AMBURN It is certified that error appears in the above-identified patent and that said Letters Patent are hereby corrected as shown below:

Column 1, line 12, after "planted" insert --by--;

Column 2, lines 10-11, change "magnetically treated the seeds" to --seeds are magnetically treated--;

Column 4, line 64, change "a hopper" to --hopper means--;

Column 4, lines 65-66, change "a seed outlet" to --seed outlet means--;

Column 4, line 67, after "outlet" insert --means--;

Column 6, line 23, after "hopper" insert --means--.

Signed and Sealed this

Seventh Day of April 1981

[SEAL]

Attest:

RENE D. TEGTMEYER

Attesting Officer  Acting Commissioner of Patents and Trademarks